United States Patent
Yun

(10) Patent No.: US 12,315,933 B2
(45) Date of Patent: May 27, 2025

(54) NEGATIVE ELECTRODE FOR LITHIUM METAL BATTERY, MANUFACTURING METHOD THEREOF, AND LITHIUM METAL BATTERY COMPRISING THE SAME

(71) Applicant: LG ENERGY SOLUTION, LTD., Seoul (KR)

(72) Inventor: Hyunwoong Yun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 579 days.

(21) Appl. No.: 17/773,355

(22) PCT Filed: Nov. 1, 2021

(86) PCT No.: PCT/KR2021/015616
§ 371 (c)(1),
(2) Date: Apr. 29, 2022

(87) PCT Pub. No.: WO2022/092979
PCT Pub. Date: May 5, 2022

(65) Prior Publication Data
US 2023/0187651 A1  Jun. 15, 2023

(30) Foreign Application Priority Data
Nov. 2, 2020 (KR) .................. 10-2020-0144665

(51) Int. Cl.
| | |
|---|---|
| *H01M 4/66* | (2006.01) |
| *H01M 4/04* | (2006.01) |
| *H01M 4/133* | (2010.01) |
| *H01M 4/134* | (2010.01) |
| *H01M 4/1393* | (2010.01) |
| *H01M 4/1395* | (2010.01) |
| *H01M 10/0525* | (2010.01) |
| *H01M 10/42* | (2006.01) |
| *H01M 4/02* | (2006.01) |

(52) U.S. Cl.
CPC ......... *H01M 4/661* (2013.01); *H01M 4/0404* (2013.01); *H01M 4/0435* (2013.01); *H01M 4/133* (2013.01); *H01M 4/134* (2013.01); *H01M 4/1393* (2013.01); *H01M 4/1395* (2013.01); *H01M 10/0525* (2013.01); *H01M 10/4235* (2013.01); *H01M 2004/027* (2013.01)

(58) Field of Classification Search
CPC .. H01M 4/661; H01M 4/0404; H01M 4/0435; H01M 4/133; H01M 4/134; H01M 4/1393; H01M 4/1395; H01M 10/0525; H01M 10/4235; H01M 2004/027

USPC ...................................................... 429/231.95
See application file for complete search history.

(56) References Cited

U.S. PATENT DOCUMENTS

| | | | |
|---|---|---|---|
| 2014/0065478 | A1* | 3/2014 | Mitsuhashi ........... H01M 4/583 427/547 |
| 2017/0317352 | A1 | 11/2017 | Lee et al. |
| 2018/0294513 | A1 | 10/2018 | Hwang et al. |
| 2019/0006714 | A1* | 1/2019 | Kano ................ H01M 10/0568 |
| 2019/0074501 | A1* | 3/2019 | Tsuchikawa ........... H01G 11/04 |
| 2019/0233388 | A1* | 8/2019 | Amine ................ H01M 10/052 |
| 2019/0326631 | A1* | 10/2019 | Choi .................... H01M 50/489 |
| 2019/0386296 | A1* | 12/2019 | He ....................... H01M 10/052 |
| 2020/0075942 | A1 | 3/2020 | Choi et al. |
| 2020/0381713 | A1 | 12/2020 | Chung et al. |
| 2020/0403230 | A1 | 12/2020 | Hong et al. |
| 2021/0083291 | A1 | 3/2021 | Lee et al. |

FOREIGN PATENT DOCUMENTS

| | | |
|---|---|---|
| CN | 107369813 A | 11/2017 |
| CN | 110383540 A | 10/2019 |
| CN | 111095616 A | 5/2020 |
| EP | 3474351 A1 | 4/2019 |
| EP | 3605678 A1 | 2/2020 |
| JP | 2012-009209 A | 1/2012 |
| KR | 10-2004-0026370 A | 3/2004 |
| KR | 10-2013-0116420 A | 10/2013 |
| KR | 10-1357241 B1 | 2/2014 |
| KR | 10-1755121 B1 | 7/2017 |
| KR | 10-2017-0117649 A | 10/2017 |
| KR | 10-2017-0124075 A | 11/2017 |
| KR | 10-2019-0057966 A | 5/2019 |
| KR | 10-2019-0130307 A | 11/2019 |
| KR | 10-2020-0054001 A | 5/2020 |

OTHER PUBLICATIONS

Son et al. Graphene balls for lithium rechargeable batteries with fast charging and high volumetric energy densities. Nature Communications, 2017. Retrieved from https://www.nature.com/articles/s41467-017-01823-7 (Year: 2017).*

* cited by examiner

*Primary Examiner* — James M Erwin
(74) *Attorney, Agent, or Firm* — Bryan Cave Leighton Paisner LLP

(57) ABSTRACT

A negative electrode for a lithium metal battery includes a metal current collector substrate, a lithium metal layer formed on at least one surface of the metal current collector substrate, and a protective layer formed on the lithium metal layer. The protective layer includes a material capable of occluding and releasing lithium in an amount of 70% by weight or more based on a total weight of the protective layer.

19 Claims, No Drawings

NEGATIVE ELECTRODE FOR LITHIUM METAL BATTERY, MANUFACTURING METHOD THEREOF, AND LITHIUM METAL BATTERY COMPRISING THE SAME

CROSS-REFERENCE TO RELATED APPLICATIONS

This application is a National Phase entry pursuant to 35 U.S.C. § 371 of International Application No. PCT/KR2021/015616, filed on Nov. 1, 2021, and claims priority to and the benefit of Korean Patent Application No. 10-2020-0144665 filed on Nov. 2, 2020 with the Korean Intellectual Property Office, the disclosure of which is incorporated herein by reference in its entirety.

TECHNICAL FIELD

The present disclosure describes a negative electrode for a lithium metal battery, a manufacturing method thereof, and a lithium metal battery comprising the same.

BACKGROUND

Details in the background section do not constitute the related art but are given only as background information concerning the subject matter of the present disclosure.

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, along with the increase of the technological development and demand for mobile devices such as portable computers, portable phones, and cameras, the demand for secondary batteries has also sharply increased as an energy source. Among such secondary batteries is a lithium secondary battery exhibiting high charge/discharge characteristics and lifespan characteristics and being environmentally friendly, in which much research has been carried out and which is now commercialized and widely used.

Generally, the secondary battery has a structure in which a non-aqueous electrolyte solution is impregnated into an electrode assembly comprising a positive electrode, a negative electrode, and a porous separator. Further, the positive electrode is generally manufactured by coating a positive electrode mixture including a positive electrode active material onto aluminum foil, and the negative electrode is manufactured by coating a negative electrode mixture including a negative electrode active material onto a copper foil.

Usually, the positive electrode active material uses a lithium transition metal oxide, and the negative electrode active material uses a carbon-based material.

However, recently, as a negative electrode active material, a lithium metal battery using a lithium metal itself exhibiting a high energy density has been commercialized.

At this time, since the lithium metal used as the negative electrode has a low density (0.54 g/cm$^3$) and a very low standard reduction potential (−3.045 V SHE: standard hydrogen electrode), it is a material that attracts considerable attention as a negative electrode material for a high-energy density battery. Further, despite problems caused by very high chemical activity, recently, with steady increase in the use of mobile communications and portable electronic devices and rapid development thereof, a demand for development of a secondary battery having high energy density is continuously increasing. Therefore, the necessity for using lithium metal negative electrodes continues to emerge.

In this case, when a lithium metal electrode is used as the negative electrode, the lithium metal has very excellent reactivity, and so it reacts with the atmosphere and collapses during the assembly of the secondary battery, and the lithium electrodeposition layer formed by charging causes a severe side reaction by direct contact with the electrolyte, which leads to rapid deterioration of lifespan characteristics.

Therefore, there is a need to develop a negative electrode that can solve the above problems and thus can be used in a lithium metal battery.

SUMMARY

The present disclosure solves the above-mentioned problems and other technical problems that have yet to be resolved.

According to embodiments of the present disclosure, a negative electrode that reduces resistance by minimizing the negative electrode from reacting with the atmosphere during assembly of the secondary battery is provided.

According to embodiments of the present disclosure, the thickness of the lithium electrodeposition layer formed during the operation of a lithium metal battery using the same is minimized, the electrodeposition density is increased, side reactions of the electrolyte solution is prevented, and thus improve lifespan characteristics of the lithium metal battery of the present disclosure and the electrodes provided therein.

In order to achieve the above object, according to one embodiment of the present disclosure, there is provided a negative electrode for a lithium metal battery, comprising: a metal current collector substrate, a lithium metal layer formed on at least one surface of the metal current collector substrate, and a protective layer formed on the lithium metal layer. The protective layer comprises a material capable of occluding and releasing lithium in an amount of 70% by weight or more based on the total weight of the protective layer.

Here, the material capable of occluding and releasing lithium comprises a carbon-based material, a lithium metal oxide, a metallic compound capable of alloying with lithium, a metal oxide, a lithium-metal alloy, or a mixture of two or more thereof, and specifically, it may be a carbon-based material, $SnO_2$, or a mixture thereof.

The metal current collector substrate may be one selected from the group consisting of copper, stainless steel, aluminum, nickel, titanium, calcined carbon, copper that is surface-treated with dissimilar metal, stainless steel that is surface-treated with dissimilar metal, and an aluminum-cadmium alloy.

The metal current collector substrate may be a metal including copper.

In one embodiment, the lithium metal layer may have a thickness of 1 to 70 μm.

In one embodiment, the material capable of occluding and releasing lithium of the protective layer may be carbon-based material, lithium titanium oxide as lithium metal oxide, Si-based material or Sn-based material as metallic compound or metal oxide, or a mixture thereof.

In one embodiment, the protective layer may have a porosity of 1 to 70%, and its thickness may be in a range of 1 μm to 100 μm.

The protective layer may further include a binder and a conductive material.

According to another embodiment of the present disclosure, there is provided a method for manufacturing the above-described negative electrode, the method comprising the steps of: (a) electrodepositing or vapor-depositing lithium metal on at least one surface of a metal current collector substrate; (b) mixing particles of a material capable of occluding and releasing lithium with a solvent to prepare a slurry; and (c) coating the slurry onto the lithium metal of the step (a), wherein the particles of the step (b) has a particle diameter of 1 μm to 30 μm.

Here, the material capable of occluding and releasing lithium may include a carbon-based material, $SnO_2$, or a mixture thereof.

At this time, in the step (b), the slurry may be prepared so that the solid content of the slurry occupies 30 to 80 vol. % based on the total volume of the slurry.

According to another embodiment of the present disclosure, there is provided a method for manufacturing the above-described negative electrode. The method may comprise the steps of: (a) electrodepositing or vapor-depositing lithium metal on at least one surface of a metal current collector substrate; (b) dispersing particles of a material capable of occluding and releasing lithium in a solvent to prepare a dispersion; and (c) coating the dispersion onto the lithium metal of the step (a), wherein the particles of the step (b) has a particle diameter of 1 nm to 1000 nm.

The material capable of occluding and releasing lithium may include a carbon-based material, $SnO_2$, or a mixture thereof.

Here, in the step (b), the slurry may be prepared so that the solid content of the dispersion occupies 0.1 to 30 vol. % based on the total volume of the dispersion.

According to yet another embodiment of the present disclosure, there is provided a lithium metal battery in which an electrode assembly is built together with a lithium non-aqueous electrolyte in a battery case (or housing), with the electrode assembly comprising: the negative electrode described above; a positive electrode having a structure in which a positive electrode mixture including an active material is coated onto at least one surface of a positive electrode current collector; and a separator interposed between the negative electrode and the positive electrode.

At this time, the negative electrode further comprises a lithium electrodeposition layer by precipitation of lithium on the protective layer, and the lithium density of the lithium electrodeposition layer may be 0.13 g/cc to 0.54 g/cc.

According to an embodiment of the present disclosure, an electrode assembly may be provided. The electrode assembly may include a negative electrode and a positive electrode. The negative electrode may include: a metal current collector substrate; a lithium metal layer formed on at least one surface of the metal current collector substrate; and a protective layer formed on the lithium metal layer. The protective layer may include a material capable of occluding and releasing lithium. In one embodiment, the protective layer may include a material having an amount of 70% or more by weight based on a total weight of the protective layer.

According to an embodiment of the present disclosure a method for manufacturing a negative electrode may be provided. The method may include the steps of: (a) electrodepositing or vapor-depositing lithium metal on at least one surface of a metal current collector substrate; (b) mixing or dispersing particles of a material capable of occluding and releasing lithium in a solvent; and (c) coating the particles onto the lithium metal.

DETAILED DESCRIPTION

Hereinafter, the present disclosure will be described in more detail for a better understanding.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments only, and is not intended to be limiting of the present disclosure. The singular forms "a," "an," and "the" are intended to include the plural forms as well, unless the context clearly indicates otherwise.

Further, throughout the specification, when a portion is referred to as "including" a certain component, it means that the portion can further include other components, without excluding the other components, unless otherwise stated.

According to one embodiment of the present disclosure, there is provided a negative electrode for a lithium metal battery, comprising: a metal current collector substrate, a lithium metal layer formed on at least one surface of the metal current collector substrate, and a protective layer formed on the lithium metal layer, wherein the protective layer comprises a material capable of occluding and releasing lithium in an amount of 70% by weight or more based on the total weight of the protective layer.

The metal current collector substrate may be one selected from the group consisting of copper, stainless steel, aluminum, nickel, titanium, calcined carbon, copper that is surface-treated with dissimilar metal, stainless steel that is surface-treated with dissimilar metal, and an aluminum-cadmium alloy.

The metal current collector substrate may be a metal including copper.

The lithium metal layer is a negative electrode active material, and the thickness and amount thereof may be determined according to the desired purpose, but is not limited thereto. For example, it may have particularly a thickness of 1 to 70 μm, and more particularly a thickness of 5 to 70 μm, more specifically 10 to 50 μm.

When the thickness is too thin and outside the above range, lithium is not sufficient as an active material, while subsequently, the lithium electrodeposition layer is formed during charging and discharging of the secondary battery and functions like an active material. Thus, when the thickness is too thick and outside the above range, the energy density relative to the volume may be rather decreased, and so it is most preferable to satisfy the above range.

Meanwhile, the protective layer may include a material capable of occluding and releasing lithium, and specifically, may be composed of materials described below.

That is, in order to achieve the effect of the present disclosure, the protective layer must essentially include a material capable of occluding and releasing lithium. If it is not a material capable of occluding and releasing lithium, the lithium metal layer can be protected from the atmosphere in the assembly process of the secondary battery, but in a subsequent charge and discharge process of the secondary battery, the protective layer cannot occlude and release lithium and thus, when the lithium electrodeposition layer is formed by charging and discharging on the protective layer, the protective layer does not occlude lithium and thus lithium is electrodeposited as it is, so it may not reduce the thickness of the lithium electrodeposition layer. Therefore, since a thick lithium electrodeposition layer may be formed with a low density as in the conventional case, it may be difficult to prevent the side reaction of the electrolyte solution, and rather, the energy density relative to volume ratio may be reduced by the protective layer, which is not preferable.

Therefore, the material capable of occluding and releasing lithium is preferably a material that can be used as an active material of a conventional negative electrode, and it may be, for example, a carbon-based material, a lithium metal oxide, a metallic compound capable of alloying with lithium, a metal oxide, a lithium-metal alloy, or a mixture of two or more thereof. Specifically, it may be carbon-based material, lithium titanium oxide as lithium metal oxide, Si-based material or Sn-based material as metallic compound or metal oxide, or a mixture thereof, which is a material with a large capacity capable of occluding lithium. More specifically, a carbon-based material, $SnO_2$, or a mixture thereof is most preferred.

The carbon-based material may be, for example, carbon such as artificial graphite, natural graphite, graphitized carbon fiber, or amorphous carbon.

The lithium metal oxide may be, for example, $Li_xFe_2O_3$ ($0 \leq x \leq 1$), $Li_xWO_2$ ($0 \leq x \leq 1$), $Li_aTi_bO_4$ ($0.5 \leq a \leq 3$, $1 \leq b \leq 2.5$), and the like.

The metallic compound capable of alloying with lithium may be a compound including a metal forming an alloy with lithium, which may be a metal such as Al, Ge, Mg, Zn, Ag, Si, or Sn.

Further, the metal oxide may be, for example, a material such as $SiO_x$ ($1 \leq x \leq 2$), SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$.

Finally, the metal in the lithium-metal alloy may be a metal such as Na, K, Rb, Cs, Fr, Be, Sr, Ba, Ra, Mg, Ca, Al, Ge, Pb, As, Sb, Bi, Ag, Zn, Cd, P, or Hg, and the lithium-metal alloy may be an alloy of the above metals and lithium.

Meanwhile, the protective layer may include materials that is often used as a negative electrode active material. In the absence of a binder, the binder effect may be supplemented through coating, drying, and rolling, and a conductive material may also not be included. However, when the thickness of the protective layer becomes thicker, a binder for further binding them and a conductive material for enhancing conductivity may be additionally included.

Specific examples of the binder may include polyvinylidene fluoride (PVDF), vinylidene fluoride-hexafluoropropylene copolymer (PVDF-co-HFP), polyvinyl alcohol, polyacrylonitrile, carboxymethylcellulose(CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro-rubber, or various copolymers thereof. The material capable of occluding and releasing lithium and the binder may be included in a ratio of 7:3 to 99:1 based on their weight.

When the content of the binder is too large and outside the above range, the protective layer is formed and thus, it may be difficult to sufficiently exhibit the effect of improving and achieving the electrodeposition density of the lithium electrodeposition layer. When the content of the binder is too small, the binder may not bind very well to the lithium metal layer, which is not preferable.

Meanwhile, such a protective layer is distinguished from the active material layer formed on the negative electrode in a conventional battery.

Specifically, they may actually react with lithium by charging and accepting lithium, but a lithium electrodeposition layer may be formed on these protective layers in a larger amount than that, and such a lithium electrodeposition layer may be used as an active material together with a lithium metal layer.

Therefore, it is preferable that the lithium metal layer existing in the lower part of the protective layer and the lithium electrodeposition layer existing in the upper part of the protective layer may be formed in a form in which the occluded lithium is connected. For this purpose, a protective layer having a porosity of a predetermined range or more is capable of connecting the lithium metal layer and the lithium electrodeposition layer by inserting lithium into the protective layer.

Therefore, the protective layer preferably has a porosity of 1% or more, specifically 10% or more, and more specifically 20% or more. In order for the protective layer to have a predetermined strength and to reduce the thickness of the lithium electrodeposition layer via the lithium occlusion mechanism, a material capable of occluding and releasing at least a certain portion of lithium is required, and thus it is preferable to have a porosity of 70% or less, specifically 60% or less, and more specifically 50% or less. Such a porosity may vary depending on the solid content, drying conditions, preparation method, and the like. Specifically, when prepared using a slurry described below, it can be formed in the range of 20 to 70%, and when preparing using a dispersant, it can be formed in the range of 1 to 30%.

Further, the protective layer is formed in a relatively thin range as an additional configuration, and it is desirable not to reduce the energy density relative to the volume of the lithium metal battery. Specifically, it may have a thickness of 0.1 μm to 100 μm, more specifically, a thickness of 1 μm to 60 μm, and most specifically a thickness of 1 μm to 50 μm.

When the protective layer is formed too thickly and outside the above range, a lot of lithium is inserted into such a protective layer, so that a lithium electrodeposition layer by electrodeposition cannot be sufficiently obtained, and a high energy density cannot be obtained. When the protective layer is formed too thinly and outside the above range, the effect of improving the electrodeposition density of lithium by charge/discharge cannot be obtained as the effect intended by the present disclosure, which is not preferable.

According to another embodiment of the present disclosure, there is provided a method for manufacturing the negative electrode of the present disclosure, the method comprising the steps of: (a) electrodepositing or vapor-depositing lithium metal on at least one surface of a metal current collector substrate; (b) mixing particles of a material capable of occluding and releasing lithium with a solvent to prepare a slurry; and (c) coating the slurry onto the lithium metal of the step (a), wherein the particles of the step (b) has a particle diameter of 1 μm to 30 μm.

Alternatively, according to another embodiment of the present disclosure, there is provided a method for manufacturing the negative electrode of the present disclosure, the method comprising the steps of: (a) electrodepositing or vapor-depositing lithium metal on at least one surface of a metal current collector substrate; (b) dispersing particles of a material capable of occluding and releasing lithium in a solvent to prepare a dispersion; and (c) coating the dispersion onto the lithium metal of the step (a), wherein the particles of the step (b) has a particle diameter of 1 nm to 1000 nm.

That is, the manufacturing method forms a protective layer by coating onto the lithium metal layer formed on at least one surface of the metal current collector substrate, but the manufacturing method differs depending on the particle diameter of the particles of the material capable of occluding and releasing lithium contained in the protective layer.

Specifically, when the particle diameter is relatively large, the step can be performed by a process of preparing a slurry such as an active material slurry and coating the same onto a lithium metal layer. When the particle diameter is relatively small, the step can be performed by a method of preparing a pre-dispersion containing these particles and coating the same onto the lithium metal layer, as in the method of preparing a conductive material pre-dispersion.

The particle diameter is the average diameter (D50) of the particles, which means a particle diameter corresponding to a point of 50% in the cumulative distribution of the number of particles relative to the particle diameter. That is, D50 is the particle diameter corresponding to a point of 50% in the cumulative distribution of the number of particles relative to the particle diameter.

This can be measured by using a laser diffraction method. Specifically, the powder to be measured is dispersed in a dispersion medium, and then introduced into a commercially available laser diffraction particle size analyzer (e.g., Microtrac S3500). When the particles pass through the laser beam, the diffraction pattern difference according to the particle size is measured to calculate the particle size distribution. D50 can be measured by calculating the particle diameter corresponding a point of 50% in the cumulative distribution of the number of particles relative to the particle diameter in the analyzer.

Specifically, the particle diameter of the particles having a larger particle diameter may be particularly 3 μm to 20 μm, and more particularly 5 μm to 15 μm.

In the preparation method as described above, in order to satisfy the effect according to the present disclosure, it is more preferable to adjust the porosity, whereby the slurry is prepared so that the content of the solids contained in the slurry occupies 30 to 80 vol. % based on the total volume of the slurry, or the dispersion is prepared so that the solid content of the dispersion occupies 0.1 to 30 vol. % based on the total volume of the dispersion. The prepared slurry or dispersion can be coated and dried to adjust the porosity.

The material capable of occluding and releasing lithium may be carbon-based material, lithium titanium oxide as lithium metal oxide, Si-based material or Sn-based material as metallic compound or metal oxide, or a mixture thereof, and more specifically, a carbon-based material, $SnO_2$, or a mixture thereof.

According to yet another embodiment of the present disclosure, there is provided a lithium metal battery in which an electrode assembly is built together with a lithium non-aqueous electrolyte in a battery case, with the electrode assembly comprising: the negative electrode; a positive electrode having a structure in which a positive electrode mixture including an active material is coated onto at least one surface of a positive electrode current collector; and a separator interposed between the negative electrode and the positive electrode.

The positive electrode has a structure in which a positive electrode mixture including an active material is coated onto at least one surface of a positive electrode current collector.

The positive electrode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, and the like can be used. In addition, the positive electrode current collector may have a thickness of 3 to 500 μm, and may have fine irregularities formed on the surface of the current collector to increase the adhesion of the positive electrode active material. For example, it may be used in various forms such as films, sheets, foils, nets, porous bodies, foams, and nonwoven fabrics.

The positive electrode active material as the active material may include, for example, a layered compound such as lithium nickel oxide ($LiNiO_2$), or a compound substituted with one or more transition metals; lithium manganese oxides such as chemical formulae $Li_{1+x}Mn_{2-x}O_4$ (where x=0~0.33), $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; a Ni-site type lithium nickel oxide represented by chemical formula $LiNi_{1-x}M_xO_2$ (where M=Co, Mn, Al, Cu, Fe, Mg, B or Ga, and x=0.01~0.3); lithium manganese composite oxide represented by chemical formulae $LiMn_{2-x}M_xO_2$ (where M=Co, Ni, Fe, Cr, Zn or Ta, and x=0.01~0.1) or $Li_2Mn_3MO_8$ (where M=Fe, Co, Ni, Cu or Zn); $LiNi_xMn_{2-x}O_4$; $LiMn_2O_4$ in which a part of Li in the chemical formula is substituted with an alkaline earth metal ion; a disulfide compound; $Fe_2(MoO_4)_3$, and the like, without being limited thereto.

The positive electrode mixture may further include a conductive material and a binder together with the positive electrode active material described above.

The conductive material is typically added in an amount of 0.1 to 30% by weight, specifically 1 to 10% by weight, and more specifically 1 to 5% by weight based on the total weight of the positive electrode mixture layer. The conductive material is not particularly limited as long as it has high conductivity without causing a chemical change in the corresponding battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives can be used.

The binder is a component that assists in coupling of an active material, a conductive material, and the like, and in coupling of a current collector, and typically, may be added in an amount of 0.1 to 30% by weight, specifically 1 to 10% by weight, more specifically 1 to 5% by weight based on the total weight of the positive electrode mixture layer. An example of the binder may include polyvinylidene fluoride, polyvinylidene fluoride-hexafluoropropylene, polyvinyl alcohol, carboxymethyl cellulose (CMC), starch, hydroxypropyl cellulose, regenerated cellulose, polyvinylpyrrolidone, polytetrafluoroethylene, polytetrafluoroethylene, polyethylene, polypropylene, ethylene-propylene-diene polymer (EPDM), sulfonated EPDM, styrene-butadiene rubber, fluorine rubber, various copolymers, and the like.

The separator is an insulating thin film having high ion permeability and mechanical strength. The pore diameter of the separator is generally 0.01 to 10 μm, and the thickness is generally 5 to 300 μm. As such separator, for example, chemical resistant and hydrophobic olefin-based polymers such as polypropylene; sheets or non-woven fabrics made of glass fiber or polyethylene is used. When a solid electrolyte such as a polymer is used as the electrolyte, the solid electrolyte may also serve as a separator.

The lithium non-aqueous electrolyte generally includes a lithium salt and a non-aqueous solvent. As the non-aqueous solvent, a non-aqueous organic solvent, an organic solid electrolyte, an inorganic solid electrolyte, or the like is used, but is not limited thereto.

As examples of the non-aqueous electrolyte, mention may be made of non-protic organic solvents, such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups, and the like.

Examples of the inorganic solid electrolyte include nitrides, halides and sulfates of lithium (Li) such as $Li_3N$, LiI, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, $Li_3PO_4-Li_2S-SiS_2$.

The lithium salt is a material that is readily soluble in the non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics, flame retardancy and the like, the non-aqueous electrolyte may further include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas. In addition, it may further include fluoroethylene carbonate (FEC), propene sultone (PRS), and the like.

The battery case (or housing) is not limited as long as it has a structure capable of housing an electrode assembly, and may be a pouch type battery, or a prismatic or cylindrical battery case made of a metal can, which is known in the art.

Meanwhile, the lithium metal battery is manufactured by incorporating an electrode assembly together with a lithium non-aqueous electrolyte into a battery case, sealing the case, and activating the battery, wherein the negative electrode may further include a lithium electrodeposition layer due to the precipitation of lithium on the protective layer.

Specifically, when lithium is charged in the protective layer, lithium is first inserted into the protective layer, and then lithium electrodeposition proceeds above the protective layer.

Therefore, according to the present disclosure, since the lithium electrodeposition layer must be essentially included, the amount of lithium provided by the positive electrode must exceed, for example, the amount that can be inserted into the protective layer of the negative electrode. In other words, if the amount of lithium that the positive electrode can provide is called the positive electrode loading (e.g., 5 $mAh/cm^2$), and the lithium insertion capacity of the protective layer formed on the negative electrode is called negative electrode loading (e.g., 1 $mAh/cm^2$), Li as much as 1 $mAh/cm^2$ forms $Li_9Al_4$, and 4 $mAh/cm^2$ forms a lithium electrodeposition layer.

The lithium electrodeposition layer is also used as a negative electrode active material. In the case where the protective layer is not formed in the past, the electrodeposition density of the lithium electrodeposition layer is 0.1 g/cc or less, which means that the electrodeposition density is low and thick, the reaction area with the electrolyte solution is wide, and the lifespan characteristics are rapidly degraded. However, according to the present disclosure, while the protective layer performs the role of occluding a predetermined portion of lithium, the electrodeposition density of the lithium electrodeposition layer increases from 0.13 g/cc to 0.54 g/cc, and the thickness decreases and thus, side reactivity with the electrolyte solution is reduced, thereby exhibiting improved lifespan characteristics.

Hereinafter, preferred examples of the present disclosure, comparative examples for comparing them, and experimental examples for evaluating them are described. However, it will be obvious to those skilled in the art that these examples are for illustrative purposes only and various changes and modifications can be made without deviating from the scope and spirit of the present description, and it goes without saying that such modifications and modifications fall within the scope of the appended claims.

Comparative Example 1

A commercially available copper current collector (I2B, Iljin Materials) was prepared as a metal current collector substrate.

A lithium foil (Li foil, thickness: 60 μm) was placed so as to be opposed to one surface of the copper current collector, and then the current collector and the lithium foil were laminated and roll-pressed to the extent that they did not detach to form a lithium metal layer. Thereby, the negative electrode was obtained.

Comparative Example 2

A commercially available copper current collector (I2B, Iljin Materials) was prepared as a metal current collector substrate.

A lithium foil (Li foil, thickness: 25 μm) was placed so as to be opposed to one surface of the copper current collector, and then the current collector and the lithium foil were laminated and roll-pressed to the extent that they did not detach to form a lithium metal layer. Thereby, the negative electrode was obtained.

Example 1

A commercially available copper current collector (I2B, Iljin Materials) was prepared as a metal current collector substrate.

A lithium foil (Li foil, thickness: 20 μm) was placed so as to be opposed to one surface of the copper current collector, and then the current collector and the lithium foil were laminated and roll-pressed to the extent that they did not detach to form a lithium metal layer.

Further, artificial graphite (particle diameter (D50): 9 μm), and binder (PVDF) were mixed in a weight ratio of 9:1 in an NMP solvent so that the solid content: NMP solvent was 5:5 by volume, thereby forming a protective layer slurry. The resulting slurry was coated and dried on the lithium metal layer to form a protective layer with a thickness of 40 μm. Thereby, the negative electrode was obtained.

Example 2

The negative electrode was obtained in the same manner as in Example 1, except artificial graphite (particle diameter (D50): 25 μm) and binder (PVDF) were mixed in a weight ratio of 9:1 in an NMP solvent so that the solid content: NMP solvent was 5:5 by volume, thereby forming a protective layer slurry, and the resulting slurry was coated and dried on the lithium metal layer to form a protective layer with a thickness of 40 μm.

Example 3

The negative electrode was obtained in the same manner as in Example 1, except lithium metal oxide $Li_4Ti_5O_{12}$ (particle diameter (D50): 3 μm), and binder (PVDF) were mixed in a weight ratio of 9:1 in an NMP solvent so that the solid content: NMP solvent was 5:5 by volume, thereby forming a protective layer slurry, and the resulting slurry was coated and dried on the lithium metal layer to form a protective layer with a thickness of 40 μm.

Example 4

The negative electrode was obtained in the same manner as in Example 1, except graphene ball (particle diameter (D50): 200 nm), and binder (PVDF) were dispersed in a weight ratio of 7:3 in an NMP solvent so that the solid content: NMP solvent was 1:9 by volume, thereby forming a dispersion, and the resulting dispersion was coated and dried on the lithium metal layer to form a protective layer with a thickness of 5 μm.

Example 5

The negative electrode was obtained in the same manner as in Example 1, except metal Zn particles (particle diameter (D50): 50 nm) and binder (PVDF) were dispersed in a weight ratio of 7:3 in an NMP solvent so that the solid content: NMP solvent was 1:9 by volume, thereby forming a dispersion, and the resulting dispersion was coated and dried on the lithium metal layer to form a protective layer with a thickness of 5 μm.

Example 6

The negative electrode was obtained in the same manner as in Example 1, except metal Ni particles (particle diameter (D50): 50 nm) and binder (PVDF) were dispersed in a weight ratio of 7:3 in an NMP solvent so that the solid content: NMP solvent was 1:9 by volume, thereby forming a dispersion, and the resulting dispersion was coated and dried on the lithium metal layer to form a protective layer with a thickness of 5 μm.

Example 7

The negative electrode was obtained in the same manner as in Example 1, except $SnO_2$ particles (particle diameter (D50): 3 μm) and binder (PVDF) were mixed in a weight ratio of 9:1 in an NMP solvent so that the solid content: NMP solvent was 5:5 by volume, thereby forming a protective layer slurry, and the resulting slurry was coated and dried on the lithium metal layer to form a protective layer with a thickness of 40 μm.

Example 8

The negative electrode was obtained in the same manner as in Example 1, except $TiO_2$ particles (particle diameter (D50): 1 μm) and binder (PVDF) were mixed in a weight ratio of 8:2 in an NMP solvent so that the solid content: NMP solvent was 3:7 by volume, thereby forming a protective layer slurry, and the resulting slurry was coated and dried on the lithium metal layer to form a protective layer with a thickness of 40 μm.

Example 9

The negative electrode was obtained in the same manner as in Example 1, except Li—Al (formed at 7:3 by weight) alloy particles (particle diameter (D50): 1 μm) and binder (PVDF) were mixed in a weight ratio of 8:2 in an NMP solvent so that the solid content: NMP solvent was 3:7 by volume, thereby forming a protective layer slurry, and the resulting slurry was coated and dried on the lithium metal layer to form a protective layer with a thickness of 40 μm.

Example 10

The negative electrode was obtained in the same manner as in Example 1, except artificial graphite (particle diameter (D50): 9 μm) and binder (PVDF) were mixed in a weight ratio of 9:1 in an NMP solvent so that the solid content: NMP solvent was 8:2 by volume, thereby forming a protective layer slurry, and the resulting slurry was coated and dried on the lithium metal layer to form a protective layer with a thickness of 40 μm.

Example 11

The negative electrode was obtained in the same manner as in Example 1, except artificial graphite (particle diameter (D50): 9 μm), and binder (PVDF) were mixed in a weight ratio of 9:1 in an NMP solvent so that the solid content: NMP solvent was 9:1 by volume, thereby forming a protective layer slurry, and the resulting slurry was coated and dried on the lithium metal layer to form a protective layer with a thickness of 40 μm.

Experimental Example 1

$LiNi_{0.8}Mn_{0.1}Co_{0.1}O_2$ as a positive electrode active material, carbon black as a conductive material, and polyvinylidene fluoride (PVdF) as a binder were used, respectively. The positive active material:the conductive material: the binder were mixed in a weight ratio of 96:2:2, and NMP as a solvent was added to the resulting mixture to prepare a positive electrode active material slurry.

The positive electrode active material slurry was coated at a loading amount of 5.01 mAh/cm² per one side of an aluminum current collector, and then dried and rolled to obtain a positive electrode.

The electrolyte solution contains a solvent in which propylene carbonate (PC), diethyl carbonate (DEC) and dimethyl carbonate (DMC) were mixed in a volume ratio of 1:2:1 (PC:DEC:DMC). The electrolyte solution containing 1 M LiFSI, 1 M LiPF$_6$ and 30 wt. % of fluoroethylene carbonate (FEC) in the total amount of the electrolyte solution was prepared.

A polyethylene separator (thickness: 20 μm) was interposed between the negative electrodes and the positive electrode of Comparative Example 1 and Examples 1 to 10 and the positive electrode, then the electrolyte solution was injected, and a CR2032 coin cell was manufactured according to a conventional method to obtain lithium metal batteries.

The prepared lithium metal battery was charged under the following conditions, and then the lithium metal battery was disassembled, and the thickness and electrodeposition density of the lithium electrodeposition layer formed on the negative electrode were calculated, and are shown in Table 1 below.

Charge: 0.2 C, CC/CV, 4.25V, 1/20 C cut-off

The thickness of the electrodeposition layer was calculated by selecting two arbitrary points and obtaining the average of the thicknesses, and the electrodeposition density of the electrodeposition layer was quantified by calculating the precipitation mass and precipitation volume.

TABLE 1

|  | Thickness (μm) | Density (g/cc) |
|---|---|---|
| Comparative Example 1 | 100 | 0.1 |
| Comparative Example 2 | 94 | 0.11 |
| Example 1 | 24 | 0.43 |
| Example 2 | 28 | 0.37 |
| Example 3 | 38 | 0.27 |
| Example 4 | 28 | 0.49 |
| Example 5 | 45 | 0.22 |
| Example 6 | 55 | 0.18 |
| Example 7 | 30 | 0.35 |
| Example 8 | 53 | 0.20 |
| Example 9 | 36 | 0.29 |
| Example 10 | 43 | 0.24 |
| Example 11 | 45 | 0.23 |

Referring to Table 1, it can be confirmed that in the case of the present disclosure, the electrodeposition density is remarkably increased.

In particular, it can be confirmed that when a carbon-based material, lithium titanium oxide, or Sn-based particles are used, the electrodeposition density can be further increased, and the particle diameter is also affected.

Further, it can be confirmed that the solid content also affects the porosity, which affects the improvement of the electrodeposition density. It can be confirmed that Example 1 having a reduced solid content and a high porosity has a higher electrodeposition density than Examples 10 and 11 where it is not so.

Experimental Example 2

The lithium metal batteries manufactured in Experimental Example 1 were charged and discharged 200 times under the following conditions, and then the 200-time discharge capacity retention rate relative to the one-time discharge capacity was calculated, and the results are shown in Table 2 below.

Charge: 0.2 C, CC/CV, 4.25V, 1/20 C cut-off
Discharge: 0.5 C, CC, 3.0V, cut-off

TABLE 2

|  | one-time discharge capacity (mAh) | 200-time capacity retention rate (%) |
|---|---|---|
| Comparative Example 1 | 6.61 | 70 |
| Comparative Example 2 | 6.65 | 40 |
| Example 1 | 6.71 | 98 |
| Example 2 | 6.65 | 97 |
| Example 3 | 6.63 | 92 |
| Example 4 | 6.65 | 99 |
| Example 5 | 6.68 | 89 |
| Example 6 | 6.61 | 85 |
| Example 7 | 6.66 | 96 |
| Example 8 | 6.69 | 84 |
| Example 9 | 6.72 | 91 |
| Example 10 | 6.61 | 87 |
| Example 11 | 6.65 | 88 |

Referring to Table 2, it can be confirmed that the electrodeposition density also affects the capacity retention rate and that in the case of the present disclosure, it shows a remarkably excellent capacity retention rate.

Based on the above disclosure, various applications and modifications can be carried out by those of ordinary skill in the art without deviating from the spirit and scope of the present disclosure.

As described above, the negative electrode according to an embodiment of the present disclosure forms a protective layer on the lithium metal layer and thus, has the effect of minimizing the reaction of the lithium metal with the atmosphere during the assembly process of the secondary battery, and reducing the increase in resistance.

Additionally, in the lithium metal battery including the negative electrode, the protective layer can occlude lithium during actual charging/discharging, whereby the thickness of the lithium electrodeposition layer formed on the protective layer can be minimized, the electrodeposition density can be increased, and thus the side reaction of the electrolytic solution can be minimized and the lifespan characteristics can be improved.

What is claimed is:

1. A negative electrode for a battery, comprising:
a metal current collector substrate;
a lithium metal layer on at least one surface of the metal current collector substrate; and
a protective layer on the lithium metal layer,
wherein the protective layer comprises a material capable of occluding and releasing lithium, wherein an amount of the material is 70% or more by weight based on a total weight of the protective layer.

2. The negative electrode according to claim 1, wherein the material comprises a carbon-based material, a lithium metal oxide, a metallic compound capable of alloying with lithium, a metal oxide, a lithium-metal alloy, or a mixture of two or more thereof.

3. The negative electrode according to claim 1, wherein the material comprises a carbon-based material, tin oxide (SnO$_2$), or a mixture thereof.

4. The negative electrode according to claim 1, wherein the metal current collector substrate is one selected from the group consisting of copper, stainless steel, aluminum, nickel, titanium, calcined carbon, copper that is surface-treated with dissimilar metal, stainless steel that is surface-treated with dissimilar metal, and an aluminum-cadmium alloy.

5. The negative electrode according to claim 1, wherein the metal current collector substrate is a metal including copper.

6. The negative electrode according to claim 1, wherein the lithium metal layer has a thickness of 1 to 70 μm.

7. The negative electrode according to claim 1, wherein the protective layer has a porosity of 1 to 70%.

8. The negative electrode according to claim 1, wherein the protective layer has a thickness in a range of 1 μm to 100 μm.

9. The negative electrode according to claim 1 wherein the protective layer further comprises a binder and a conductive material.

10. A method for manufacturing the negative electrode according to claim 1, the method comprising the steps of:
 (a) electrodepositing or vapor-depositing lithium metal on the at least one surface of the metal current collector substrate;
 (b) mixing particles of the material capable of occluding and releasing lithium with a solvent to prepare a slurry; and
 (c) coating the slurry onto the lithium metal of the step (a),
 wherein the particles of the step (b) has a particle diameter of 1 μm to 30 μm.

11. The method for manufacturing the negative electrode according to claim 10, wherein the material comprises a carbon-based material, $SnO_2$, or a mixture thereof.

12. The method for manufacturing the negative electrode according to claim 10, wherein, in the step (b), the slurry is prepared so that the solid content of the slurry occupies 30 to 80% by volume based on a total volume of the slurry.

13. A method for manufacturing the negative electrode according to claim 1, the method comprising the steps of:
 (a) electrodepositing or vapor-depositing lithium metal on the at least one surface of the metal current collector substrate;
 (b) dispersing particles of the material capable of occluding and releasing lithium in a solvent to prepare a dispersion; and
 (c) coating the dispersion onto the lithium metal of the step (a),
 wherein the particles of the step (b) has a particle diameter of 1 nm to 1000 nm.

14. The method for manufacturing the negative electrode according to claim 13, wherein the material capable of occluding and releasing lithium comprises a carbon-based material, $SnO_2$, or a mixture thereof.

15. The method for manufacturing the negative electrode according to claim 3, wherein, in the step (b), the dispersion is prepared so that the solid content of the dispersion occupies 0.1 to 30% by volume based on the total volume of the dispersion.

16. A battery, comprising:
 an electrode assembly and lithium non-aqueous electrolyte in a housing, the electrode assembly comprising:
  the negative electrode according to claim 1;
  a positive electrode including a positive electrode mixture and a positive electrode current collector, the positive electrode mixture including an active material coated onto at least one surface of the positive electrode current collector; and
  a separator between the negative electrode and the positive electrode.

17. The battery according to claim 16, wherein the negative electrode further comprises a lithium electrodeposition layer by precipitation of lithium on the protective layer, and the lithium density of the lithium electrodeposition layer is 0.13 g/cc to 0.54 g/cc.

18. An electrode assembly, comprising:
 a negative electrode and a positive electrode, the negative electrode comprising:
  a metal current collector substrate;
  a lithium metal layer on at least one surface of the metal current collector substrate; and
  a protective layer on the lithium metal layer,
  wherein the protective layer comprises a material capable of occluding and releasing lithium,
  wherein an amount of the material is 70% or more by weight based on a total weight of the protective layer.

19. A method for manufacturing a negative electrode, the method comprising the steps of:
 (a) electrodepositing or vapor-depositing lithium metal on at least one surface of a metal current collector substrate;
 (b) mixing or dispersing particles of a material capable of occluding and releasing lithium in a solvent; and
 (c) coating the particles onto the lithium metal to form a protective layer,
 wherein an amount of the material is 70% or more by weight based on a total weight of the protective layer.

* * * * *